United States Patent [19]

Scherzer

[11] Patent Number: 4,880,521

[45] Date of Patent: * Nov. 14, 1989

[54] PROCESS FOR THE CRACKING OF FEEDSTOCKS CONTAINING HIGH LEVELS OF NITROGEN

[75] Inventor: Julius Scherzer, Anaheim, Calif.

[73] Assignee: Union Oil Company of California, Los Angeles, Calif.

[ * ] Notice: The portion of the term of this patent subsequent to Mar. 7, 2006 has been disclaimed.

[21] Appl. No.: 312,625

[22] Filed: Feb. 17, 1989

Related U.S. Application Data

[63] Continuation-in-part of Ser. No. 47,852, May 7, 1987, Pat. No. 4,810,369.

[51] Int. Cl.$^4$ .............................................. C10G 11/05
[52] U.S. Cl. ..................................... 208/120; 208/121; 208/254 R
[58] Field of Search .................... 208/120, 254 R, 121

[56] References Cited

U.S. PATENT DOCUMENTS

| | | | |
|---|---|---|---|
| 2,962,435 | 11/1960 | Fleck et al. | 208/119 |
| 3,933,621 | 1/1976 | White et al. | 208/120 |
| 4,090,948 | 5/1978 | Schwarzenbek | 208/113 |
| 4,137,154 | 1/1979 | Audeh | 208/254 R |
| 4,390,416 | 6/1983 | Ritter et al. | 208/120 |
| 4,417,974 | 11/1983 | Haunschild | 208/121 |
| 4,457,833 | 7/1984 | Zandona et al. | 208/120 |
| 4,458,023 | 7/1984 | Welsh et al. | 502/65 |
| 4,480,047 | 10/1984 | Beck et al. | 502/65 |
| 4,515,683 | 5/1985 | Beck et al. | 208/113 |
| 4,551,231 | 11/1985 | Kovach et al. | 208/52 CT |
| 4,664,780 | 5/1987 | Lochow et al. | 208/120 |
| 4,708,786 | 11/1987 | Occelli | 208/120 |
| 4,731,174 | 3/1988 | Occelli | 208/254 R |
| 4,747,935 | 5/1988 | Scherzer | 208/120 |
| 4,810,369 | 3/1989 | Scherzer | 208/254 R |

FOREIGN PATENT DOCUMENTS

| | | | |
|---|---|---|---|
| 0967136 | 5/1975 | Canada | 502/68 |
| 0109064 | 5/1984 | European Pat. Off. | 502/64 |

OTHER PUBLICATIONS

J. Scherzer and D. P. McArthur, "Tests Show Effects of Nitrogen Compounds on Commercial Fluid Cat Cracking Catalysts," *Oil & Gas Journal*, Oct. 27, 1986, pp. 76-82.

J. Scherzer and D. P. McArthur, "Nitrogen Resistance of FCC Catalysts," *Katalistiks' 7th Annual Fluid Cat Cracking Symposium*, May 12-13, 1986, pp. 10:1-10:16.

L. D. Silverman, S. Winkler, J. A. Tiethof, and A. Witoshkin, "Matric Effects in Catalytic Cracking," *National Petroleum Refiners Association Annual Meeting*, Mar. 23-25, 1986.

G. W. Young, "Fluid Catalytic Cracker Catalyst Design for Nitrogen Tolerance," *Journal of Physical Chemistry*, vol. 90, 1986, pp. 4894-4900.

C. M. Fu and A. M. Schaffer, "Effect of Nitrogen Compounds on Cracking Catalysts," *Ind. Eng. Chem. Prod. Res. Dev.*, vol. 24, 1985, pp. 68-75.

R. F. Schwab and K. Baron, "Fluid Catalytic Cracking of High Metal Content Feedstocks", *2nd Katalisticks Fluid Cat Cracking Symposium*, May 12-13, 1981, pp. 7.1-7.20.

G. A. Mills, E. R. Bordeker and A. G. Oblad, "Chemical Characterization of Catalysts. I. Poisoning of Cracking Catalysts by Nitrogen Compounds and Potassium Ion," *Journal of American Chemical Society*, vol. 72, 1950, pp. 1554-1560.

K. Tanabe, *Solid Acids and Bases*, Academic Press, 1970, pp. 58-66.

*Primary Examiner*—Anthony McFarlane
*Attorney, Agent, or Firm*—Yale S. Finkle; Gregory F. Wirzbicki

[57] ABSTRACT

Hydrocarbon feedstocks containing relatively high levels of nitrogen contaminants are converted by catalytic cracking to products of lower average molecular weight by contacting the feedstock under cracking conditions with a cracking catalyst having a surface area of at least 150 m$^2$/gm and comprising greater than about 25 weight percent of a Y zeolite dispersed in a matrix containing a synthetic silica-alumina component in which the weight ratio of silica-to-alumina is preferably equal to or greater than about 0.10.

29 Claims, No Drawings

PROCESS FOR THE CRACKING OF FEEDSTOCKS CONTAINING HIGH LEVELS OF NITROGEN

CROSS-REFERENCE TO RELATED APPLICATIONS

This application is a continuation-in-part of application Ser. No. 047,852, filed in the U.S. Patent and Trademark Office on May 7, 1987, now U.S. Pat. No. 4,810,369. The disclosure of the latter application is hereby incorporated by reference in its entirety.

BACKGROUND OF THE INVENTION

This invention relates to a catalytic cracking process and is particularly concerned with the cracking of feedstocks containing substantial quantities of nitrogen-containing compounds.

Fluidized catalytic cracking (FCC) units are used in the petroleum industry to convert high boiling hydrocarbon feedstocks to more valuable hydrocarbon products, such as gasoline, having a lower average molecular weight and a lower average boiling point than the feedstocks from which they were derived. The conversion is normally accomplished by contacting the hydrocarbon feedstock with a moving bed of catalyst particles at temperatures ranging between about 800° F. and about 1100° F. The most typical hydrocarbon feedstock treated in FCC units comprises a heavy gas oil, but on occasion such feedstocks as light gas oils or atmospheric gas oils, naphthas, reduced crudes and even whole crudes are subjected to catalytic cracking to yield low boiling hydrocarbon products.

Catalytic cracking in FCC units is generally accomplished by a cyclic process involving separate zones for catalytic reaction, steam stripping, and catalyst regeneration. The hydrocarbon feedstock is blended with an appropriate amount of catalyst particles to form a mixture that is then passed through a catalytic reactor, normally referred to as a riser, wherein the mixture is subjected to a temperature between about 800° F. and about 1100° F., normally between about 900° F. and 1050° F. in order to convert the feedstock into gaseous, lower boiling hydrocarbons. After these gaseous, lower boiling hydrocarbons are separated from the catalyst in a suitable separator, such as a cyclone separator, the catalyst, now deactivated by coke deposited upon its surfaces, is passed to a stripper. Here the deactivated catalyst is contacted with steam to remove entrained hydrocarbons that are then combined with vapors exiting the cyclone separator to form a mixture that is subsequently passed downstream to other facilities for further treatment. The coke-containing catalyst particles recovered from the stripper are introduced into a regenerator, normally a fluidized bed regenerator, where the catalyst is reactivated by combusting the coke in the presence of an oxygen-containing gas, such as air, at a temperature which normally ranges between about 1000° F. and about 1500° F. The cyclic process is then completed by blending the reactivated catalyst particles with the feedstock entering the riser or reaction zone of the FCC unit.

It is well known that catalytic cracking feedstocks which contain high levels of nitrogen have a deleterious effect on cracking catalysts. The nitrogen is typically present in the form of basic or neutral organic compounds, primarily aromatic compounds containing nitrogen heteroatoms such as pyridines, quinolines, and indoles, which are strongly sorbed on the acidic sites of the cracking catalyst. The nitrogen compounds react or otherwise interact with the acidic sites so as to decrease the activity of the catalyst. This deactivation results in decreased conversions and gasoline production. Levels of nitrogen in the feedstock as small as 0.01 weight percent, calculated as the element, can result in some decrease in activity of the catalyst; however, significant deactivation is not normally encountered unless the concentration of nitrogen in the feedstock increases to about 0.10 weight percent or above. Nitrogen poisoning of cracking catalysts is quite severe when the feedstock is a synthetic oil derived from carbonaceous solids such as oil shale, coal, tar sands and the like. Such synthetic oils tend to have relatively high concentrations of nitrogen, sometimes ranging as high as 5.0 weight percent, calculated as the element.

In order to avoid substantial deactivation of cracking catalysts by nitrogen compounds in feedstocks containing high levels of nitrogen, it has been standard practice to treat such feedstocks to reduce the concentration of nitrogen compounds prior to subjecting the feedstocks to catalytic cracking. Techniques employed in the past for removing the nitrogen compounds from the feedstocks include (1) adsorbing the compounds on solid material such as silica, alumina or various grades of clay, (2) treating the feedstock with mineral acids to form water-soluble salts of the basic nitrogen compounds, which salts can readily be removed from the feedstock, and (3) treating the feedstock in the presence of added hydrogen with a hydrogenation catalyst. Of these three techniques, the latter one, hydroprocessing, is the one most frequently used. However, in order to remove substantial quantities of residual nitrogen, hydrogenation pressures up to 5000 p.s.i.g. are typically required. Installation of equipment to carry out such a high pressure process requires a substantial capital investment. The other two techniques also have disadvantages in that they too require the installation of additional equipment and are not always able to remove as much nitrogen as desired.

Accordingly, it is one of the objects of the present invention to provide a fluid catalytic cracking process for treating feedstocks that contain relatively high concentrations of nitrogen constituents while maintaining the activity of the catalyst at a reasonable level. It is another object of the invention to provide such a process without the necessity of first treating the feedstock to remove substantially all or a portion of the nitrogen-containing compounds. These and other objects of the invention will become more apparent in view of the following description of the invention.

SUMMARY OF THE INVENTION

In accordance with the invention, it has now been found that catalysts containing greater than about 25 weight percent of a Y zeolite having cracking activity dispersed in a matrix comprising a synthetic silica-alumina component have a high nitrogen resistance and retain their activity and selectivity during use in the catalytic cracking of hydrocarbon feedstocks containing greater than about 0.10 weight percent total nitrogen, calculated as the element. These catalysts are sufficiently nitrogen resistant that it is unnecessary to mix them with separate particles of a nitrogen scavenging material, which particles protect the catalysts from nitrogen poisoning in the cracking reaction zone by preferentially sorbing nitrogen compounds from the feed. The nitrogen-resistant catalysts used in the process of the invention normally have a surface area of at least 150 m²/gm, preferably at least 200 m²/gm. The matrix of the catalyst typically contains a clay such as kaolin in addition to the synthetic silica-alumina component, which synthetic component usually contains sufficient silica such that the silica-to-alumina weight ratio is preferably equal to or greater than about 0.10.

In general, the feedstock to the process of the invention will contain greater than about 0.10 weight percent total nitrogen, calculated as the element, usually above about 0.20 weight percent and typically between about 0.20 and about 0.80 weight percent. Normally, the feed is a gas oil derived from petroleum and contains between about 0.25 and about 0.55 weight percent total nitrogen, calculated as the element. The concentrations of total nitrogen referred to herein are concentrations determined by the Kjeldal analytical method.

The process of the invention has many advantages over other catalytic cracking processes used for treating feedstocks containing relatively high concentrations of nitrogen in that it allows for the processing of such feedstocks without first having to install equipment to treat the feedstock in order to reduce its nitrogen concentration prior to subjecting it to catalytic cracking.

DETAILED DESCRIPTION OF THE INVENTION

In accordance with the invention, a fluidized catalytic cracking (FCC) process, or other cyclic catalytic cracking process, in which a hydrocarbon feedstock containing nitrogen compounds is refined to produce lower-boiling hydrocarbon products by passing the feedstock in contact with a cracking catalyst through a catalytic cracking reaction zone in the substantial absence of added molecular hydrogen is improved by using a catalyst comprising greater than about 25 weight percent of a Y zeolite, preferably a Y zeolite that has been exchanged with rare earth metal or ammonium cations, dispersed in a matrix comprising a silica-alumina component in which the silica-to-alumina weight ratio is normally greater than or equal to about 0.10.

The Y zeolites which can be used as a constituent of the catalyst include any Y zeolite or modified Y zeolite which possesses cracking activity and has the characteristic crystal structure of a Y zeolite as indicated by the essential X-ray powder diffraction pattern of Y zeolite. U.S. Pat. No. 3,130,007, the disclosure of which is hereby incorporated by reference in its entirety, describes Y-type zeolites having framework silica-to-alumina mole ratios between 3.0 and 6.0 with a typical Y zeolite having a framework silica-to-alumina mole ratio of about 5.0. An example of an essentially unmodified Y zeolite which can be used in the catalyst is LZY-62 zeolite, a zeolite prepared by exchanging the sodium Y zeolite known as LZY-52 with ammonium cations. Both LZY-52 and LZY-62 zeolites are sold by the Linde Division of Union Carbide Corporation.

The modified Y zeolites suitable for use as the cracking component of the catalyst are generally derived from Y zeolites by treatment which results in a significant modification of the Y zeolite framework structure, usually an increase in the framework silica-to-alumina mole ratio to a value typically above 6.0. It will be understood, however, that, in converting a Y zeolite starting material to a modified Y zeolite useful in the present invention, the resulting modified Y zeolite may not have exactly the same X-ray powder diffraction pattern for Y zeolites as is disclosed in U.S. Pat. No. 3,130,007. The d-spacings may be shifted somewhat due to a shrinkage in the unit cell size caused by an increase in the framework silica-to-alumina mole ratio. The essential crystal structure of the Y zeolite will, however, be retained so that the essential X-ray powder diffraction pattern of the modified zeolite used in the cracking catalyst will be consistent with that of either Y zeolite itself or a Y zeolite of reduced unit cell size. Examples of modified Y zeolites that can be used in the process of the invention include ultrastable Y zeolites, steam-stabilized Y zeolites and dealuminated Y zeolites.

Steam-stabilized Y zeolites are Y zeolites which have been hydrothermally treated to increase the framework silica-to-alumina mole ratio but not the overall silica-to-alumina mole ratio of the zeolite. Steam stabilization normally involves calcination of the ammonium or hydrogen form of the Y zeolite starting material at relatively high temperatures, typically above about 900° F., in the presence of steam. This treatment results in the expulsion of tetrahedral aluminum from framework into nonframework positions, but normally does not remove the aluminum from the zeolite and therefore does not increase the overall silica-to-alumina mole ratio of the starting Y zeolite. A preferred steam-stabilized Y zeolite is one produced by first ammonium exchanging a Y zeolite to a sodium content between about 0.6 and 5 weight percent, calculated as $Na_2O$, calcining the ammonium-exchanged zeolite at a temperature between about 600° F. and 1650° F. in the presence of steam at a water vapor partial pressure of at least 0.2 p.s.i.a. to reduce the unit cell size of the ammonium-exchanged zeolite to a value in the range between about 24.40 and 24.64 angstroms, and then ammonium exchanging the steam-calcined zeolite to replace at least 25 percent of the residual sodium ions and obtain a zeolite product of less than about 1.0 weight percent sodium, preferably less than about 0.6 weight percent sodium, calculated as $Na_2O$. Such a Y zeolite is highly stable and maintains a high activity. The zeolite is described in detail in U.S. Pat. No. 3,929,672, the disclosure of which is hereby incorporated by reference in its entirety. The same or a similar zeolite is sold by the Linde Division of Union Carbide Corporation as LZY-82 zeolite.

The dealuminated Y zeolites that can be used as a component of the cracking catalyst are Y zeolites which have been chemically treated with acids, salts, or chelating agents to increase the overall silica-to-alumina mole ratio. A preferred group of dealuminated zeolites is prepared by dealuminating a Y zeolite having an overall silica-to-alumina mole ratio below about 6.0 and is described in detail in U.S. Pat. Nos. 4,503,023 and 4,711,720, the disclosures of which patents are hereby incorporated by reference in their entireties. A preferred member of this group of zeolites is known as LZ-210, a zeolitic aluminosilicate molecular sieve available from the Linde Division of the Union Carbide Corporation. LZ-210 zeolites and other zeolites of this group are conveniently prepared from a Y zeolite starting material in overall silica-to-alumina mole ratios between about 6.0 and about 20, although higher ratios are possible. Preferred LZ-210 zeolites have an overall silica-to-alumina mole ratio of about 6.1 to about 16. Typically, the unit cell size is at or below 24.65 angstroms and will normally range between about 24.40 and about 24.60 angstroms. LZ-210 zeolites having an overall silica-to-alumina mole ratio below 20 generally have a sorptive capacity for water vapor of at least 20 weight percent based on the anhydrous weight of the zeolite at 25° C. and 4.6 millimeters mercury water vapor partial pressure. Normally, the oxygen sorptive capacity at 100 millimeters mercury and −183° C. will be at least 25 weight percent. In general, LZ-210 zeolites are prepared by treating Y zeolites with an aqueous solution of a fluorosilicate salt, preferably a solution of ammonium hexafluorosilicate.

The stability and/or acidity of the Y zeolites described above may be increased by exchanging the zeolite with ammonium ions, polyvalent metal cations, such as rare earth-containing cations, magnesium cations or calcium cations, or a combination of ammonium ions and polyvalent metal cations, thereby lowering the sodium content until it is less than about 0.8 weight percent, preferably less than about 0.5 weight percent, and most preferably less than about 0.3 weight percent, calculated as $Na_2O$. Methods of carrying out the ion exchange are well known in the art.

For purposes of this invention, it is preferred that the Y zeolites used in the cracking catalyst be converted to their rare earth form by ion exchanging the zeolite with rare earth metal cations. The rare earth metals selected for ion exchange may be any one or any combination of the lanthanide elements having atomic numbers between 57 and 71. Metals suitable for ion exchange include lanthanum, cerium, praseodymium, neodymium, samarium, europium, gadolinium, terbium, dysprosium, holmium, erbium, thulium, ytterbium and lutetium. Normally, a mixture of rare earth cations derived from a rare earth ore is introduced into the zeolite. Examples of rare earth ores that may be used as a source of rare earth metal cations include bastnaesite, monazite and xenotine.

There are many known methods for exchanging rare earth metal cations for sodium and other cations in a crystalline aluminosilicate Y zeolite. The normal procedure is to contact the zeolite with an aqueous solution containing multivalent cations of the rare earth element or elements to be exchanged into the zeolite. The solution normally contains more than about 20 grams per liter of rare earth metal cations (calculated as $RE_2O_3$, where RE is the sum of all rare earth metals under consideration, regardless of whether any one or more of such metals actually forms a trioxide of equivalent formula), and the contacting is usually accomplished by immersing the zeolite into the ion exchange solution and heating the resultant solid-liquid mixture while stirring to a temperature above ambient but usually to no more than about 100° C. If a single immersion of the zeolite into the ion exchange solution is not sufficient to accomplish the desired degree of exchange, several immersions may be used.

Typically, the ion exchange of rare earth metal cations into the zeolite will lower the sodium content of the zeolite to between about 3.0 and 4.0 weight percent sodium, calculated as $Na_2O$. In order to lower the sodium content further, it is normally necessary to calcine the rare earth exchanged Y zeolite and then exchange the calcined zeolite with ammonium ions. The ammonium ion exchange is carried out by mixing the calcined zeolite with an aqueous solution containing a dissolved ammonium salt, such as ammonium nitrate, ammonium sulfate, ammonium chloride, and the like. The resulting slurry is stirred for between about 1 and about 5 hours at temperatures above ambient but less than about 100° C. Such an ammonium ion exchange can be used to lower the sodium concentration in the zeolite to less than 1.0 weight percent. If sodium levels below 0.8 weight percent are desired, the ion exchange procedure will ordinarily have to be repeated at least once. Normally, the ion exchange procedure will be repeated at least twice and occasionally several times before a reduction in sodium content below 0.3 weight percent is achieved. After the ammonium ion exchange is completed, the Y zeolite will typically contain between about 9.0 and about 17 weight percent, preferably between about 11 and about 14 weight percent, of rare earth metals, calculated as $RE_2O_3$.

The Y zeolite, which has preferably been exchanged with rare earth metal cations, is combined with an acidic matrix or binder to form the finished nitrogen resistant catalyst. In order for the catalyst to retain a relatively high activity when used to crack feedstocks containing high concentrations of nitrogen, it is normally necessary that the finished catalyst contain greater than about 25 weight percent of the Y zeolite. The catalyst will typically contain between about 25 and 50 weight percent of the Y zeolite, preferably between about 25 and 40 weight percent.

In some cases it may be desirable for the finished catalyst to contain another zeolite in addition to the Y zeolite which has preferably been exchanged with rare earth cations. Usually this additional zeolite will not be a rare earth exchanged zeolite, but will be in the hydrogen form or will contain polyvalent metal cations other than rare earth metal cations. Examples of additional zeolites that may be used include a non-rare earth exchanged Y zeolite, modified Y zeolites such as stabilized and ultrastable Y zeolites, X zeolite, offretite, mordenite, ferrierite, ZSM-5 zeolite and other pentasil zeolites, and LZ-210 zeolite. When it is desired to utilize a zeolite in addition to the Y zeolite that has preferably been exchanged with rare earth cations, the finished catalyst will normally contain between about 1.0 and about 25 weight percent of the additional zeolite, preferably between about 5.0 and about 15 weight percent. The total amount of both zeolites present in the catalyst will, however, not normally exceed 50 weight percent.

The matrix used with the Y zeolite and any additional zeolite comprises a synthetic silica-alumina component which typically contains at least 10 weight percent silica. Such matrices are acidic and for this reason tend to enhance the resistance of the catalyst to nitrogen poisoning. It has been found that matrices containing a synthetic silica-alumina component in which the weight ratio of silica-to-alumina is equal to or greater than 0.1 are normally acidic enough to provide the finished catalyst with a high level of nitrogen resistance. The term "synthetic silica-alumina component" as used herein refers to a man-made silica-alumina component as opposed to a naturally occurring component such as clay which also comprises silica and alumina. Normally, the weight ratio of silica-to-alumina in the synthetic silica-alumina component will range between about 0.10 and about 10, preferably between about 0.25 and 5.0, most preferably between about 0.30 and about 1.0. Since the use of synthetic silica-alumina components which contain lesser amounts of silica may result in more economical catalysts, it may be desirable to use the least amount of silica possible while maintaining a relatively high level of nitrogen resistance. For this reason, it is sometimes advantageous that the weight ratio of silica-to-alumina in the synthetic component be below about 0.50, preferably below about 0.45. The synthetic silica-alumina component of the catalyst can be synthesized separately and subsequently combined with the Y zeolite or it can be formed in situ by mixing the Y zeolite with a source of alumina and a source of silica as is described in more detail hereinafter.

In addition to the synthetic silica-alumina component, the matrix of the catalyst may contain another inorganic refractory oxide component or mixture of such components. The additional component may be a synthetic component, such as titania, zirconia, magnesia and the like, a pillared or delaminated clay, or, preferably, a naturally occurring relatively nonporous clay such as kaolin, hectorite, sepiolite or attapulgite. When another inorganic refractory oxide component is present in the matrix, the synthetic silica-alumina component will typically comprise at least 10 weight percent, usually between about 10 and 50 weight percent, of the matrix, preferably between about 15 and about 40 weight percent. The alumina in the synthetic silica-alumina component of the matrix will normally comprise less than about 35 weight percent, preferably less than about 30 weight percent, of the matrix and typically between about 10 and 25 weight percent. The matrix will usually comprise between about 50 and 75 weight percent of the finished catalyst.

The catalyst used in the process of the invention is preferably formed by mixing the Y zeolite component, which has preferably been exchanged with rare earth metal cations, and, when desired, an additional zeolite, with the matrix components or precursors thereof by techniques including mixing, mulling, blending or homogenization. Examples of silica precursors that may be used to provide the silica in the silica-alumina component of the matrix include silica sols, silica hydrogels and sodium silicate. Examples of precursors that may be used to provide the alumina in the synthetic silica-alumina component of the matrix include alumina sols, alumina hydrogels, aluminum chlorhydrol, Catapal alumina, and soluble aluminum salts such as sodium aluminate and aluminum sulfate. Aluminum chlorhydrol and silica sols are, respectively, the preferred sources of alumina and silica because they provide the finished catalyst with a high attrition resistance. In a preferred method of preparing the cracking catalyst, a rare earth exchanged Y zeolite is intimately mixed with a silica sol, aluminum chlorhydrol and a clay such as kaolin to form a slurry which is spray-dried to produce finished catalyst particles that normally range in diameter between about 40 and about 80 microns. If desired, however, the rare earth exchanged Y zeolite may be mulled or otherwise mixed with a preformed matrix, extruded and then ground into the desired particles size range. Normally, the finished catalyst will have an average bulk density between about 0.30 and about 1.0 gm/cm$^3$.

In order for the finished catalyst to have a high resistance to poisoning by nitrogen compounds in the catalytic cracking feedstock, it is desirable that the surface area be at least about 150 m$^2$/gm, e.g., above about 175 m$^2$/gm, but preferably at least 200 m$^2$/gm. The actual surface area of the catalyst will depend on the amount of zeolite present and the source of alumina in the synthetic silica-alumina component of the matrix. For example, the surface area of the catalyst can be increased by using more zeolite in the catalyst and using Catapal alumina as the source of alumina for the synthetic silica-alumina component of the matrix. In general, the finished catalyst will have a surface area between about 150 and about 350 m$^2$/gm and a nitrogen pore volume of at least 0.10 cm$^3$/gm, preferably between about 0.14 to about 0.50 cm$^3$/gm.

It has been found that the above-described catalysts have a high tolerance to nitrogen and are thus very effective for use in cracking feedstocks containing relatively high concentrations of nitrogen, typically concentrations greater than about 0.10 weight percent total nitrogen, calculated as the element, e.g., above 0.25 weight percent. The process of the invention is typically used to treat petroleum derived feedstocks having total nitrogen concentrations ranging between about 0.20 and about 0.80 weight percent calculated as the element. The process of the invention can also be used to crack feedstocks derived from carbonaceous solids such as coal, oil shale, and tar sands.

In general, it is preferred that the feedstock to the process of the invention not contain significant concentrations of metals, such as nickel, vanadium, iron, copper and the like. Normally, the concentration of metals in the feedstock is such that the following relationship exists:

$$10[Ni]+[V]+[Fe]<10 \quad (1)$$

where [Ni], [V], and [Fe] are the concentrations of nickel, vanadium and iron, respectively, in parts per million by weight. Preferably the sum of the values on the left hand side of equation (1) above will be less than about 8.0, most preferably less than about 5.0. Also, the concentrations of nickel and vanadium in the feedstock will typically be such that the concentration of nickel plus the concentration of vanadium is less than about 10 ppmw, preferably less than about 5 ppmw. In general, the individual concentrations of nickel, vanadium, and iron in the feedstock will be less than about 8.0 ppmw, preferably less than about 5.0 ppmw, and most preferably less than about 1.0 ppmw.

The hydrocarbon feedstocks that can be effectively treated using the process of the invention include any hydrocarbon feedstock normally used in cyclic catalytic cracking processes to produce low boiling hydrocarbons, which feedstock also contains relatively high concentrations of nitrogen. Examples of such feedstocks are vacuum gas oils, atmospheric gas oils, naphtha and the like. Normally, the feed material will have an API gravity in the range between about 18° and about 28°, preferably between about 20° and about 25°. A typical feedstock will contain more than about 70 volume percent liquids boiling above about 650° F. Suitable feedstocks not only include petroleum derived fractions but also hydrocarbon oils derived from coal, oil shale, tar sands and similar hydrocarbon-containing solids.

The nature and objects of the invention are further illustrated by the following examples, which are provided for illustrative purposes only and not to limit the invention as defined by the claims. Examples I through VII illustrate the effect of zeolite amount and type on the effectiveness of a cracking catalyst to crack high-nitrogen feedstocks. Examples VIII through XV show the importance of matrix composition and catalyst surface area when cracking feedstocks containing high levels of nitrogen.

EXAMPLE I

An experimental cracking catalyst designated as Catalyst I is prepared by mixing 1050 grams (dry basis) of a low soda, rare earth exchanged conventional Y zeolite having a framework silica-to-alumina mole ratio of 5.0 with 3300 grams of a colloidal silica sol containing 525 grams of silica. The mixture is stirred in an industrial blender for 2 to 3 minutes and the resultant slurry is placed in a Cowles mixer along with 1400 grams (dry basis) of kaolin. The slurry is stirred in the Cowles mixer for 10 minutes at moderate speed. Aluminum chlorhydrol powder (1129 grams) containing 525 grams alumina is dissolved in 1410 milliliters of warm water and added gradually to the mixture while stirring. Upon the initial addition of the aluminum chlorhydrol, gelation of the slurry takes place but the slurry becomes fluid again with further addition of the aluminum chlorhydrol solution. Water is then added to obtain a 35 weight percent solids slurry and the mixture is stirred again for 10 minutes at high speed. The slurry is spray-dried and the resultant product is screened to produce particles between 40 and 140 microns in diameter. These particles are calcined at 595° C. for 2 hours. The formulation, chemical composition and physical properties of the catalyst are set forth below in Table 1.

EXAMPLE II

An experimental catalyst designated as Catalyst II is prepared by the procedure described in Example I except 1400 grams (dry basis) of the rare earth exchanged Y zeolite and 1050 grams (dry basis) of kaolin clay are used. The formulation, chemical composition and physical properties of this catalyst are also set forth in Table 1.

EXAMPLE III

Another experimental catalyst designated as Catalyst III is prepared by the procedure described in Example I except (1) 1225 grams (dry basis) of the steam-stabilized Y zeolite known as LZY-82 zeolite are used in lieu of the rare earth exchanged conventional Y zeolite, (2) the colloidal silica sol is diluted with 1650 ml. of water, (3) 1225 grams (dry basis) of kaolin are used and (4) sufficient water is added before spray drying to produce a 30 weight percent solids slurry. The formulation, chemical composition and physical properties of this catalyst are set forth in Table 1.

EXAMPLE IV

Another experimental cracking catalyst designated as Catalyst IV is prepared by the procedure described in Example I except 1225 grams (dry basis) of a rare earth exchanged LZY-82 zeolite containing 5.42 weight percent rare earths (RE) are used in lieu of the rare earth exchanged conventional Y zeolite and 1225 grams (dry basis) of kaolin clay are used. The formulation, chemical composition and physical properties of this catalyst are set forth in Table 1.

EXAMPLE V

Another experimental catalyst designated as Catalyst V is prepared by the procedure described in Example I except 1400 grams (dry basis) of a rare earth exchanged LZY-82 zeolite containing 5.18 weight percent rare earths ($RE_2O_3$) are used in lieu of the rare earth exchanged conventional Y zeolite and 1050 grams (dry basis) of kaolin clay are used. The formulation, chemical composition, and physical properties of this catalyst are set forth in Table 1.

EXAMPLE VI

Another experimental catalyst designated as Catalyst VI is prepared by the procedure described in Example I except 1225 grams (dry basis) of a dealuminated Y zeolite known as LZ-210 zeolite and having an overall silica-to-alumina mole ratio of about 9.0 are used in lieu of the rare earth exchanged Y zeolite, and 1225 grams (dry basis) of kaolin clay are used. The formulation, chemical composition, and physical properties of this catalyst are also set forth in Table 1.

TABLE 1

| Catalyst No. | I | II | III | IV | V | VI |
|---|---|---|---|---|---|---|
| Catalyst Formulation | | | | | | |
| Zeolite (wt. %) | 30% REY | 40% REY | 35% LZY-82 | 35% RE-LZY-82 | 40% RE-LZY-82 | 35% LZ-210 |
| Matrix | | | | | | |
| Silica (wt %) | 15 | 15 | 15 | 15 | 15 | 15 |
| Alumina (wt %) | 15 | 15 | 15 | 15 | 15 | 15 |
| Kaolin (wt %) | 40 | 30 | 35 | 35 | 30 | 35 |
| Chemical Composition[1] | | | | | | |
| $Al_2O_3$ (wt %) | 39.8 | 36.0 | 37.5 | 37.6 | 34.6 | 33.5 |
| $Na_2O$ (wt %) | 0.20 | 0.17 | 0.22 | 0.24 | 0.14 | 0.21 |
| $RE_2O_3$ (wt %) | 4.62 | 5.85 | — | 1.90 | 2.07 | — |
| Physical Properties | | | | | | |
| SA[2], $m^2/g$ | 228 | 273 | 243 | 220 | 308 | 299 |
| ABD[3], g/cc | 0.73 | 0.72 | 0.78 | 0.80 | 0.82 | 0.82 |
| $N_2$—PV[4], cc/g | 0.19 | 0.22 | 0.22 | 0.23 | 0.24 | 0.24 |

[1]Each catalyst, besides containing $Al_2O_3$, $Na_2O$ and $RE_2O_3$, contains $SiO_2$ as its other component.
[2]Surface area
[3]Average bulk density
[4]Nitrogen pore volume

EXAMPLE VII

The experimental catalysts produced in Examples I through VI are tested for their effectiveness as nitrogen resistant catalysts during the catalytic cracking of nitrogen-containing feedstocks as follows. A sample of each catalyst is deactivated for testing in 100 percent flowing steam at 1450° F. for five hours. The deactivated catalysts are then evaluated for cracking activity utilizing the standard microactivity test (MAT) method using three feedstocks containing, respectively, 0.30, 0.48 and 0.74 weight percent total nitrogen. Properties of the three feedstocks are identified below in Table 2.

TABLE 2

| | Feedstock Properties | | |
|---|---|---|---|
| | A | B | C |
| Gravity, °API | 22.0 | 22.8 | 24.4 |
| Sulfur, wt % | 1.19 | 1.06 | 0.93 |
| Nitrogen, wt % | 0.30 | 0.48 | 0.74 |
| Basic Nitrogen, wt % | 0.094 | 0.16 | 0.37 |
| Conradson C., wt % | 0.12 | 0.1 | 0.07 |
| Metals, ppm | | | |
| Fe | 4 | 3 | 2 |
| Ni | 0.6 | <0.5 | <0.5 |
| V | <0.2 | <0.5 | <0.5 |
| Cu | <0.1 | — | — |

The MAT tests are carried out at atmospheric pressure and at a temperature of 950° F. utilizing a weight hourly space velocity (WHSV) of 14.5 and a catalyst-to-oil ratio of about 3.6. The results of these tests are set forth below in Table 3.

TABLE 3

| Catalyst No. | I | II | III | IV | V | VI |
|---|---|---|---|---|---|---|
| Zeolite Type (wt %) | 30% REY | 40% REY | 35% LZY-82 | 35% RE-LZY-82 | 40% RE-LZY-82 | 35% LZ-210 |
| Feed A - 0.30 wt % N | | | | | | |
| Conversion (Vol %) | 86 | 88 | 63 | 74 | 77 | 58 |
| Gasoline (Vol %) | 63.1 | 60.9 | 51.0 | 54.1 | 54.6 | 45.5 |
| LCO[1] (Vol %) | 11.0 | 9.4 | 24.0 | 18.9 | 17.4 | 24.9 |
| DO[2] (Vol %) | 3.0 | 2.4 | 12.8 | 6.9 | 5.9 | 17 |
| H$_2$ (SCF/B) | 59 | 63 | 113 | 101 | 102 | 81 |
| Coke (wt %) | 7.6 | 9.0 | 3.0 | 3.9 | 4.2 | 2.7 |
| Feed B - 0.48 wt % N | | | | | | |
| Conversion (Vol %) | 82 | 87 | 50 | — | — | 52 |
| Gasoline (Vol %) | 56.8 | 59.7 | 39.1 | — | — | 40.4 |
| LCO[1] (Vol %) | 13.9 | 10.4 | 29.7 | — | — | 30.3 |
| DO[2] (Vol %) | 4.5 | 2.7 | 20.5 | — | — | 17.8 |
| H$_2$ (SCF/B) | 30 | 66 | 96 | — | — | 74 |
| Coke (wt %) | 8.0 | 10.1 | 2.9 | — | — | 2.6 |
| Feed C - 0.74 wt % N | | | | | | |
| Conversion (Vol %) | 75 | 83 | 43 | — | — | 44 |
| Gasoline (Vol %) | 53.1 | 57.0 | 32.1 | — | — | 33.5 |
| LCO[1] (Vol %) | 18.6 | 13.6 | 34.7 | — | — | 36.7 |
| DO[2] (Vol %) | 6.9 | 3.9 | 22.3 | — | — | 19.1 |
| H$_2$ (SCF/B) | 25 | 75 | 79 | — | — | 55 |
| Coke (wt %) | 7.2 | 8.9 | 2.9 | — | — | 2.4 |

[1] Light cycle oil
[2] Decant oil

As can be seen from the data set forth in Table 3 for Catalysts I and II, the conversion obtained using each feedstock increases as the concentration of the rare earth exchanged Y zeolite increases. For Feed A, which contains 0.30 weight percent total nitrogen, conversion increases from 86 volume percent to 88 volume percent while for Feed C, which contains the highest concentration of nitrogen (0.74 weight percent), the conversion increases from 75 volume percent to 83 volume percent. These data also indicate that, for a given catalyst composition, the activity as measured by conversion declines with increasing nitrogen content in the feedstock. For example, the conversion obtained with Catalyst I is 86 volume percent when Feed A containing 0.30 weight percent nitrogen is used. The conversion decreases to 82 volume percent as the nitrogen content of the feed increases to 0.48 weight percent (Feed B) and further decreases to 75 volume percent as the nitrogen content of the feedstock increases to 0.74 weight percent (Feed C).

The conversion and gasoline yield data set forth in Table 3 for Catalysts III, IV, V and VI indicate that the activity and gasoline selectivity of Catalysts IV and V are not as high as obtained with Catalysts I and II, which catalysts contain a rare earth exchanged Y zeolite, while the activity and gasoline selectivity of Catalysts III and VI are quite poor in comparison. For example, Catalyst III, which contains LZY-82 zeolite in an amount that is more than the amount of zeolite in Catalyst I, yields a conversion which is significantly lower when using each of the three nitrogen-containing feedstocks. Also, the activity and gasoline selectivity of Catalysts III and VI decrease significantly as the nitrogen content in the feedstock increases. A comparison of the data obtained using Catalyst III with that obtained using Catalysts IV and V, which contain, respectively, 35 and 40 weight percent LZY-82 zeolite that has been exchanged with rare earth metal cations, indicates that the presence of rare earths in the LZY-82 zeolite results in much higher conversion and gasoline yields For example, at a nitrogen concentration of 0.30 weight percent in the feedstock (Feed A), the conversion for Catalyst III is 63 volume percent compared to 74 volume percent for Catalyst IV and 77 volume percent for Catalyst V. Similarly, the gasoline yields obtained with Catalysts IV and V are 54.1 and 54.6 volume percent, respectively, compared to 51 volume percent obtained using Catalyst III. Although the conversions and gasoline yields obtained with Catalysts IV and V are not as high as those obtained with Catalysts I and II, the coke make of 3.9 and 4.2 weight percent, respectively, is much smaller. Reduced coke make is a distinct advantage for the use of a rare earth exchanged LZY-82 steam-stabilized zeolite as a component of the catalyst. The above-discussed data clearly indicate the advantage of utilizing a rare earth exchanged Y or modified Y zeolite in a catalyst for cracking high nitrogen-containing feedstocks.

The effect of the amount and type of zeolite used in a cracking catalyst on the nitrogen resistance of the catalyst is discussed in the papers entitled "Tests Show Effects of Nitrogen Compounds on Commercial Fluid Cat Cracking Catalysts" and "Nitrogen Resistance of FCC Catalysts," both papers of which are authored by J. Scherzer and D. P. McArthur and published, respectively, in the *Oil and Gas Journal*, Oct. 27, 1986 and in the proceedings of the Katalistiks' 7th Annual Fluid Cat Cracking Symposium in May of 1986. The disclosures of these two papers are hereby incorporated by references in their entireties.

EXAMPLE VIII

An experimental catalyst designated as Catalyst VIII is prepared by mixing 600 grams (dry basis) of a low soda, rare earth exchanged conventional Y zeolite having a framework silica-to-alumina mole ratio of 5.0 with 5921 grams of a colloidal silica sol containing 900 grams of silica. The mixture is placed in a Cowles mixer and stirred for 10 minutes, after which time 1500 grams (dry basis) of kaolin are added. The resultant mixture is stirred for an additional 10 minutes to produce a slurry having a solids content of about 30 weight percent. The slurry is spray-dried and the resultant product is screened to produce particles between 40 and 140 microns in diameter. These particles are not subjected to calcination. The formulation, chemical composition and physical properties of the catalyst are set forth below in Table 4. Since the matrix of the catalyst contains no alumina, it has a relatively low acidity.

TABLE 4

| Catalyst No. | VIII | IX | X | XI |
|---|---|---|---|---|
| Catalyst Formulation | | | | |
| REY Zeolite (wt %) | 20 | 20 | 20 | 20 |
| Matrix | | | | |
| Silica (wt %) | 30 | 10 | 30 | 10 |
| Alumina (wt %) | — | 20 | 10 | 20[1] |
| Kaolin (wt %) | 50 | 50 | 40 | 50 |
| Calcined | no | yes | yes | no |
| Chemical Composition[2] | | | | |
| $Al_2O_3$ (wt %) | 26.9 | 46.0 | 31.4 | 44.6 |
| $Na_2O$ (wt %) | 0.20 | 0.21 | 0.22 | 0.20 |
| $RE_2O_3$ (wt %) | 2.72 | 2.74 | 2.79 | 2.76 |
| Physical Properties | | | | |
| SA[3], $m^2/g$ | 260 | 158 | 203 | 234 |
| ABD[4], g/cc | 0.85 | 0.80 | 0.74 | 0.82 |
| $N_2$—PV[5], cc/g | 0.22 | 0.14 | 0.22 | 0.33 |
| Hg—PV[6], cc/g | 0.55 | 0.41 | 0.39 | 0.70 |
| Matrix Acidity[7] | Low | Medium | High | |

[1]The alumina in Catalyst XI is derived from Catapal alumina. In all other catalysts it is derived from alumina chlorhydrol.
[2]Each catalyst, besides containing $Al_2O$, $Na_2O$, and $RE_2O_3$, contains $SiO_2$ as its other component.
[3]Surface area
[4]Average bulk density
[5]Nitrogen pore volume
[6]Mercury pore volume
[7]Matrix Bronsted acidity as measured by infrared spectroscopy using 2,6-lutidine adsorption.

EXAMPLE IX

Another experimental catalyst designated as Catalyst IX is prepared by mixing 600 grams (dry basis) of the same low soda, rare earth exchanged Y zeolite used in Example VIII with 1961 grams of a colloidal silica sol containing 300 grams of silica. The mixture is placed in a Cowles mixer along with 1000 ml of water and stirred for 5 minutes at moderate speeds. Kaolin in an amount of 1500 grams (dry basis) and 400 ml of water are then added to the Cowles mixer and the resultant slurry is stirred for another 10 minutes. Aluminum chlorhydrol powder (1290 grams) containing 600 grams of alumina is dissolved in 1610 milliliters of warm water and added gradually to the mixture while stirring. Upon the initial addition of the aluminum chlorhydrol, gelation of the slurry takes place but the slurry becomes fluid again with further addition of the aluminum chlorhydrol solution. Water is then added and the resultant mixture is stirred for 10 minutes at high speed to produce a 35 weight percent solids slurry. The slurry is spray-dried as described in Example VIII and the resultant particles are calcined at 595° C. for 2 hours. The formulation, chemical composition and physical properties of the catalyst are set forth in Table 4. The synthetic silica-alumina component of the matrix contains silica (10%) and alumina (20%) in a weight ratio of 0.5. The matrix has a medium acidity.

EXAMPLE X

Another experimental cracking catalyst designated as Catalyst X is prepared by mixing 600 grams (dry basis) of the same low soda, rare earth exchanged Y zeolite utilized in Example VIII with 5882 grams of colloidal silica sol containing 900 grams of silica. The mixture is placed in a Cowles mixer and stirred for 2 to 3 minutes, after which period of time 1200 grams (dry basis) of kaolin are added to the mixture. The resultant slurry is stirred in the Cowles mixer for another 10 minutes followed by the addition of 645 grams of aluminum chlorhydrol powder containing 300 grams of alumina, which powder is dissolved in 806 milliliters of warm water. Upon the initial addition of the aluminum chlorhydrol, gelation of the slurry takes place but the slurry becomes fluid again with further addition of the aluminum chlorhydrol solution. The resultant mixture is stirred for 10 minutes at high speeds to produce a 32 weight percent solids slurry. The slurry is spray-dried and calcined as described in Example IX above. The formulation, chemical composition and physical properties of the catalyst are set forth in Table 4. The synthetic silica-alumina component of the matrix contains silica (30%) and alumina (10%) in a weight ratio of 3.0. The matrix has a relatively high acidity.

EXAMPLE XI

Another experimental catalyst designated as Catalyst XI is prepared by first peptizing 800 grams (dry basis) of Catapal alumina by mixing the Catapal alumina with 7669 ml of water and 90 ml of 88 weight percent formic acid. The mixture is placed in a Cowles mixer along with 800 grams (dry basis) of the same low soda, rare earth exchanged Y zeolite used in Example VIII and the resultant mixture is stirred for 10 minutes to produce a thick slurry. As stirring is continued, 2564 grams of colloidal silica sol containing 400 grams of silica is added followed by the addition of 2000 grams (dry basis) of kaolin and 9000 ml of water. The stirring is continued for 10 minutes to produce a 16 weight percent solids slurry. The slurry is spray-dried as described in Example VIII. The formulation, chemical composition and physical properties of the catalyst are set forth in Table 4. As can be seen in the table, Catalyst XI has the same formulation as Catalyst IX but, since the source of alumina is Catapal alumina and not aluminum chlorhydrol, Catalyst XI has a much higher surface area than Catalyst IX.

EXAMPLE XII

Experimental Catalysts VIII through XI are tested for their effectiveness as nitrogen resistant catalytic cracking catalysts in the same manner as Catalysts I through VI were tested in Example VII. As in Example VII, the MAT test for each feedstock is carried out at atmospheric pressure and at a temperature of 950° F. utilizing a weight hourly space velocity of 14.5 and a catalyst-to-oil ratio of 3.6. The results of these tests are set forth below in Table 5.

TABLE 5

| Catalyst No. | VIII | IX | X | XI |
|---|---|---|---|---|
| Surface area (m²/g) | 260 | 158 | 203 | 234 |
| Matrix acidity[1] | Low | Medium | High | |
| Feed A - 0.30 wt % N | | | | |
| Conversion (Vol %) | 75 | 77 | 80 | 83 |
| Gasoline (Vol %) | 59.2 | 60.0 | 63.3 | 64.0 |
| LCO[2] (Vol %) | 18.1 | 17.5 | 15.9 | 13.9 |
| DO[3] (Vol %) | 6.9 | 5.5 | 4.1 | 3.1 |
| H$_2$ (SCF/B) | 29 | 66 | 67 | 122 |
| Coke (wt %) | 5.2 | 6.1 | 7.0 | 6.7 |
| Feed B - 0.48 wt % N | | | | |
| Conversion (Vol %) | 66 | 68 | | |
| Gasoline (Vol %) | 50.0 | 51.8 | | |
| LCO[2] (Vol %) | 23.3 | 21.4 | | |
| DO[3] (Vol %) | 10.7 | 9.6 | | |
| H$_2$ (SCF/B) | 34 | 76 | | |
| Coke (wt %) | 4.6 | 5.0 | | |
| Feed C - 0.74 wt % N | | | | |
| Conversion (Vol %) | 55 | 58 | | |
| Gasoline (Vol %) | 40.5 | 44.0 | | |
| LCO[2] (Vol %) | 29.1 | 27.5 | | |
| DO[3] (Vol %) | 15.9 | 14.5 | | |
| H$_2$ (SCF/B) | 28 | 65 | | |
| Coke (wt %) | 4.2 | 4.6 | | |

[1]Matrix Bronsted acidity as measured by infrared spectroscopy using 2,6-lutidine adsorption.
[2]Light cycle oil
[3]Decant oil As can be seen from the data set forth in Table 5, the conversion and gasoline yields obtained using Catalysts VIII, IX and X with feedstocks containing various concentrations of nitrogen increase as the acidity of the matrix increases. The Catalyst VIII matrix in addition to kaolin contains only silica and no alumina. Silica is a known low acidity component and therefore the acidity of the Catalyst VIII matrix is low. The Catalyst X matrix, on the other hand, contains a synthetic silica-alumina component in which the weight ratio of silica-to-alumina is 3.0 and has a high acidity. The Catalyst IX matrix also contains a synthetic silica-alumina component but the silica-to-alumina weight ratio in this component is much smaller than in the synthetic silica-alumina component in the Catalyst X matrix. Thus, the Catalyst IX matrix has a medium acidity. Since Catalysts VIII, IX and X each contain the same amount and type of rare earth exchanged Y zeolite, the data in Table 5 indicate that increasing the acidity of the catalyst matrix results in higher conversions and gasoline yields. It is theorized that the increase in activity with increasing matrix acidity is due in part to the activity of the acidic matrix itself and in part to the neutralization of some of the basic nitrogen components by acid sites of the matrix, which neutralization results in the protection of the zeolite from the poisonous nitrogen compounds.

As mentioned previously, Catalysts IX and XI have the same formulation. The major difference between the catalysts is that the source of alumina utilized to prepare Catalyst IX is aluminum chlorhydrol while the source of the alumina used in Catalyst XI is Catapal alumina. The use of different sources of alumina resulted in Catalyst IX having a surface area of 158 m²/gm as compared to the much higher surface area of 234 m²/gm for Catalyst XI. As seen in Table 4, the nitrogen and mercury pore volumes for Catalyst XI are also much higher than those for Catalyst IX. Comparing the data for Catalysts IX and XI in Table 5 obtained with Feed A (0.30 weight percent total nitrogen) it is seen that the higher surface area and pore volume possessed by Catalyst XI results in higher conversions and gasoline production: 83 volume percent conversion and 64 volume percent gasoline yield versus 77 volume percent conversion and 60 volume percent gasoline yield. In general, it is preferred that the nitrogen resistant catalyst used in the process of the invention have a surface area greater than about 200 m²/gm.

It is emphasized, however, that a high catalyst surface area must normally be accompanied by a highly acidic matrix in order for the catalyst to have maximum resistance to nitrogen poisoning. This is made clear by comparing the conversion and gasoline yields for Catalysts VIII and X in Table 5. As can be seen, Catalyst VIII has a much higher surface area than Catalyst X (260 m²/gm versus 203 m²/gm), but is much less active (75 versus 80 volume percent conversion) and selective (59.2 versus 63.3 volume percent, gasoline). Obviously, the low acidity of the Catalyst VIII matrix was responsible for its inferior performance as compared to that of the lower surface area Catalyst X.

EXAMPLE XIII

Another experimental cracking catalyst designated as Catalyst XIII is prepared by mixing 1225 grams (dry basis) of the steam stabilized Y zeolite known as LZY-82 that has been exchanged with rare earth metal cations with 4950 grams of a colloidal silica sol containing 787.5 grams of silica. The mixture is stirred for 2 to 3 minutes in a blender and then placed in a Cowles mixer and stirred for 5 minutes, after which period of time 1225 grams (dry basis) of kaolin are added to the mixture. The resultant slurry is stirred in the Cowles mixer for another 10 minutes followed by the addition of 564.5 grams of aluminum chlorhydrol powder containing 262.5 grams of alumina, which powder is dissolved in 705 milliliters of warm water. Upon the initial addition of the aluminum chlorhydrol, gelation of the slurry takes place but the slurry becomes fluid again with further addition of the aluminum chlorhydrol solution. Water is then added to produce a 35 weight percent solids slurry which is stirred for 10 minutes at high speed and then spray-dried. The resultant spray-dried product is screened to produce particles between 40 and 140 microns in diameter. These particles are calcined at 595° C. for 2 hours. The formulation and chemical composition of the catalysts are set forth in Table 6. The synthetic silica-alumina component of the matrix contains silica (22.5%) and alumina (7.5%) in a weight ratio of 3.0.

TABLE 6

| Catalyst No. | XIII | XIV |
|---|---|---|
| Catalyst Formulation | | |
| RE-LZY-82 zeolite (wt. %) | 35 | 35 |
| Matrix | | |
| Silica (wt. %) | 22.5 | 5 |
| Alumina (wt. %) | 7.5 | 15 |
| Kaolin (wt. %) | 35 | 45 |
| Chemical Composition | | |
| Al$_2$O$_3$ (wt. %) | 29.5 | 38.9 |
| SiO$_2$ (wt. %) | 68.7 | 54.4 |
| Na$_2$O (wt. %) | 0.17 | 0.20 |
| RE$_2$O$_3$ (wt. %) | 1.63 | 2.46 |
| Surface Area (m²/g) | 268 | 272 |

Feed A -

TABLE 6-continued

| Catalyst No. | XIII | XIV |
|---|---|---|
| | 0.30 wt. % N | |
| Conversion (vol. %) | 70 | 74 |
| Gasoline (vol. %) | 50.2 | 54.6 |
| LCO[1] (vol. %) | 22.2 | 18.2 |
| DO[2] (vol. %) | 7.8 | 7.8 |
| H$_2$ (SCF/B) | 105 | 83 |
| Coke (wt. %) | 2.9 | 4.0 |

[1]Light Cycle Oil
[2]Decant Oil

EXAMPLE XIV

Another experimental catalyst designated as Catalyst XIV is prepared by mixing 1050 grams (dry basis) of essentially the same steam stabilized Y zeolite utilized in Example XIII with 943 grams of colloidal silica sol containing 150 grams of silica and 1900 milliliters of water. The Y zeolite used in this example differs from that used in Example XIII in that it contains a higher concentration of rare earths. The mixture of rare earth exchanged Y zeolite and colloidal silica sol is placed in a Cowles mixer and stirred for 10 minutes at high speeds. Kaolin in the amount of 1350 grams (dry basis) is then added to the Cowles mixer and the resultant slurry is stirred for another 10 minutes. Aluminum chlorhydrol powder (968 grams) containing 450 grams of alumina is dissolved in 1210 milliliters of warm water and the resultant solution is added gradually to the mixture while stirring. Upon the initial addition of the aluminum chlorhydrol, gelation of the slurry takes place but the slurry becomes fluid again with further addition of the aluminum chlorhydrol solution. Water is then added to produce a 35 weight percent solids slurry which is stirred for 10 minutes at high speed and then spray-dried as described in Example XIII. The resultant particles are calcined at 595° C. for 2 hours. The formulation and chemical composition of the catalysts are set forth in Table 6. The synthetic silica-alumina component of the matrix contains silica (5%) and alumina (15%) in a weight ratio of 0.333.

EXAMPLE XV

Experimental Catalysts XIII and XIV are tested for their effectiveness as nitrogen resistant catalytic cracking catalysts in the same manner as Catalysts I through VI and VIII through XI were tested in Examples VII and XII, respectively, except that each of these catalysts is deactivated for testing in 100 percent flowing steam at 1500° F. instead of 1450° F. for 5 hours and only Feed A is used. As in the previously mentioned examples, the MAT test for each feedstock is carried out at atmospheric pressure and at a temperature of 950° F. utilizing a weight hourly space velocity (WHSV) of 14.5. The catalyst-to-oil ratio utilized in testing Catalyst XIII is 3.6 while that used for testing Catalyst XIV is 3.7. The results of these tests are set forth in Table 6.

As can be seen from the data set forth in Table 6, the conversion and gasoline yields obtained using Catalyst XIV are superior to those obtained utilizing Catalyst XIII even though the silica-to-alumina weight ratio in the synthetic component of the matrix of Catalyst XIV is only 0.33 as compared to a ratio of 3.0 for Catalyst XIII. Although the increased amount of rare earths present in Catalyst XIV as compared to Catalyst XIII, i.e., 2.46 versus 1.63 weight percent, will increase the conversion and gasoline yield of the catalyst, the data do indicate that the use of lower silica-to-alumina weight ratios in the synthetic component of the matrix is certainly possible without deleterious effects. Thus, it is concluded that effective catalysts can be economically produced by decreasing the amount of silica in the synthetic silica-alumina component of the matrix.

It will be apparent from the foregoing that the invention provides a process for the catalytic cracking of nitrogen contaminated feedstocks in which the cracking catalyst is highly nitrogen resistant and maintains a relatively high activity and selectivity for gasoline. The nitrogen tolerance of the catalyst results in longer run times between catalyst changeovers and the need for less makeup catalyst. These factors in turn result in lower cost operations.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for the catalytic cracking of a hydrocarbon feedstock containing greater than about 0.25 weight percent total nitrogen, calculated as the element, which comprises contacting said feedstock with a cracking catalyst under cracking conditions in the substantial absence of added molecular hydrogen in a cracking zone to convert components of said feedstock into lower molecular weight constituents, wherein said cracking catalyst comprises greater than about 25 weight percent of a Y zeolite dispersed in a matrix comprising a clay and a synthetic silica-alumina component.

2. A process as defined by claim 1 wherein said clay comprises kaolin.

3. A process as defined by claim 2 wherein said cracking catalyst comprises greater than about 30 weight percent of said Y zeolite.

4. A process as defined by claim 1 wherein the weight ratio of silica-to-alumina in said synthetic silica-alumina component is equal to or greater than about 0.10.

5. A process as defined by claim 1 wherein the weight ratio of silica-to-alumina in said synthetic silica-alumina component is between about 0.25 and 5.0.

6. A process as defined by claim 1 wherein said Y zeolite is selected from the group consisting of ultrastable Y zeolites, steam-stabilized Y zeolites and dealuminated Y zeolites.

7. A process as defined by claim 1 wherein said Y zeolite has been exchanged with rare earth metal cations.

8. A process as defined by claim 6 wherein said Y zeolite is a steam stabilized Y zeolite.

9. A process as defined by claim 8 wherein said steam stabilized Y zeolite is LZY-82 zeolite.

10. A process as defined by claim 6 wherein said Y zeolite is a dealuminated Y zeolite.

11. A process as defined by claim 10 wherein said dealuminated Y zeolite is LZ-210 zeolite.

12. A process as defined by claim 1 wherein the source of alumina in said synthetic silica-alumina component is aluminum chlorhydrol.

13. A process as defined by claim 1 wherein the individual concentrations of nickel and vanadium in said hydrocarbon feedstock are less than 1.0 ppmw.

14. A process for the catalytic cracking of a hydrocarbon feedstock containing greater than about 0.10 weight percent total nitrogen, calculated as the element, which comprises contacting said feedstock with a cracking catalyst under cracking conditions in the substantial absence of added molecular hydrogen in a cracking zone to convert components of said feedstock into lower molecular weight constituents, wherein said cracking catalyst comprises greater than about 30 weight percent of a rare earth exchanged Y zeolite dispersed in a matrix comprising a clay and a synthetic silica-alumina component in which component the weight ratio of silica-to-alumina is greater than about 0.25 and wherein the individual concentrations of nickel and vanadium in aid hydrocarbon feedstock are less than 1.0 ppmw.

15. A process as defined by claim 14 wherein said clay comprises kaolin.

16. A process as defined by claim 15 wherein said rare earth exchanged Y zeolite is a rare earth exchanged steam-stablized Y zeolite.

17. A process as defined by claim 16 wherein the weight ratio of silica-to-alumina in said synthetic silica-alumina component is between about 0.3 and about 1.0.

18. A process as defined by claim 17 wherein said rare earth exchanged steam-stabilized Y zeolite is a rare earth exchanged LZY-82 zeolite.

19. A process as defined by claim 14 wherein said hydrocarbon feedstock contains greater than about 0.25 weight percent total nitrogen, calculated as the element.

20. A process as defined by claim 14 wherein said cracking catalyst further comprises a zeolite selected from the group consisting of a stabilized Y zeolite, an ultrastable Y zeolite, LZ-210 zeolite, ZSM-5 zeolite, offretite, mordenite and ferrierite.

21. A process for the catalytic cracking of a hydrocarbon feedstock containing greater than about 0.10 weight percent total nitrogen, calculated as the element, which comprises contacting said feedstock with a cracking catalyst under cracking conditions in the substantial absence of added molecular hydrogen in a cracking zone to convert components of said feedstock into lower molecular weight constituents, wherein said cracking catalyst comprises greater than about 25 weight percent of a Y zeolite dispersed in a matrix comprising a synthetic silica-alumina component and wherein the individual concentrations of nickel and vanadium in said hydrocarbon feedstock are less than about 8.0 ppmw.

22. A process as defined by claim 21 wherein the individual concentrations of nickel and vanadium in said hydrocarbon feedstock are less than about 5.0 ppmw.

23. A process as defined by claim 21 wherein the individual concentrations of nickel and vanadium in said hydrocarbon feedstock are less than 1.0 ppmw.

24. A process as defined by claim 21 said matrix further comprises kaolin.

25. A process as defined by claim 21 wherein said Y zeolite comprises a rare earth exchanged Y zeolite.

26. A process as defined by claim 25 wherein said rare earth exchanged Y zeolite comprises a rare earth exchanged steam-stabilized Y zeolite.

27. A process as defined by claim 26 wherein said steam-stabilized Y zeolite is prepared by the process comprising (1) ammonium exchanging a sodium Y zeolite to a sodium content between about 0.6 and about 5 weight percent, calculated as $Na_2O$, (2) calcining the ammonium-exchanged zeolite at a temperature between about 600° F. and about 1650° F. in the presence of steam at a water vapor partial pressure of at least about 0.2 p.s.i.a. to reduce the unit cell size of said ammonium-exchanged zeolite to a value in the range between about 24.20 and about 24.64 Angstroms, and (3) ammonium exchanging the steam-calcined zeolite to reduce the sodium content of the zeolite below about 0.6 weight percent, calculated as $Na_2O$.

28. A process as defined by claim 27 wherein said steam-stabilized Y zeolite is LZY-82 zeolite.

29. A process as defined by claim 21 wherein said hydrocarbon feedstock contains greater than about 0.25 weight percent total nitrogen, calculated as the element.

* * * * *